F. LOWENSTEIN.
VARIABLE ELECTRICAL APPARATUS.
APPLICATION FILED AUG. 10, 1916.
1,258,423.
Patented Mar. 5, 1918.
2 SHEETS—SHEET 2.
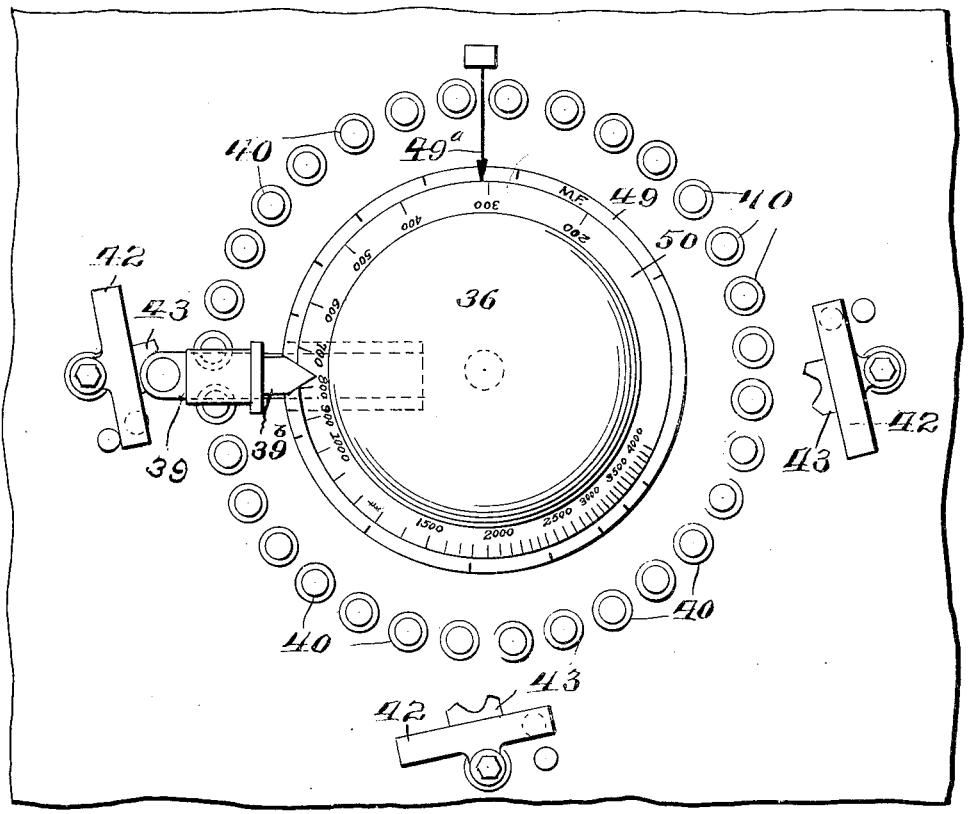
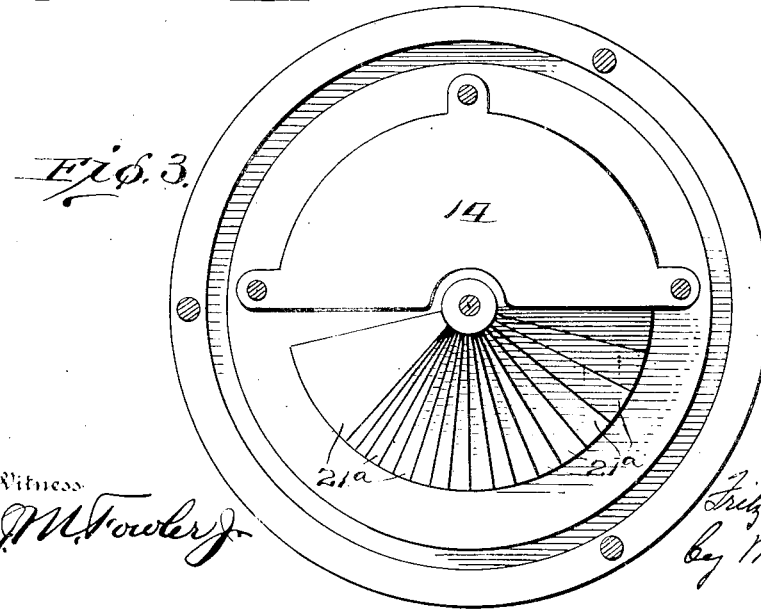

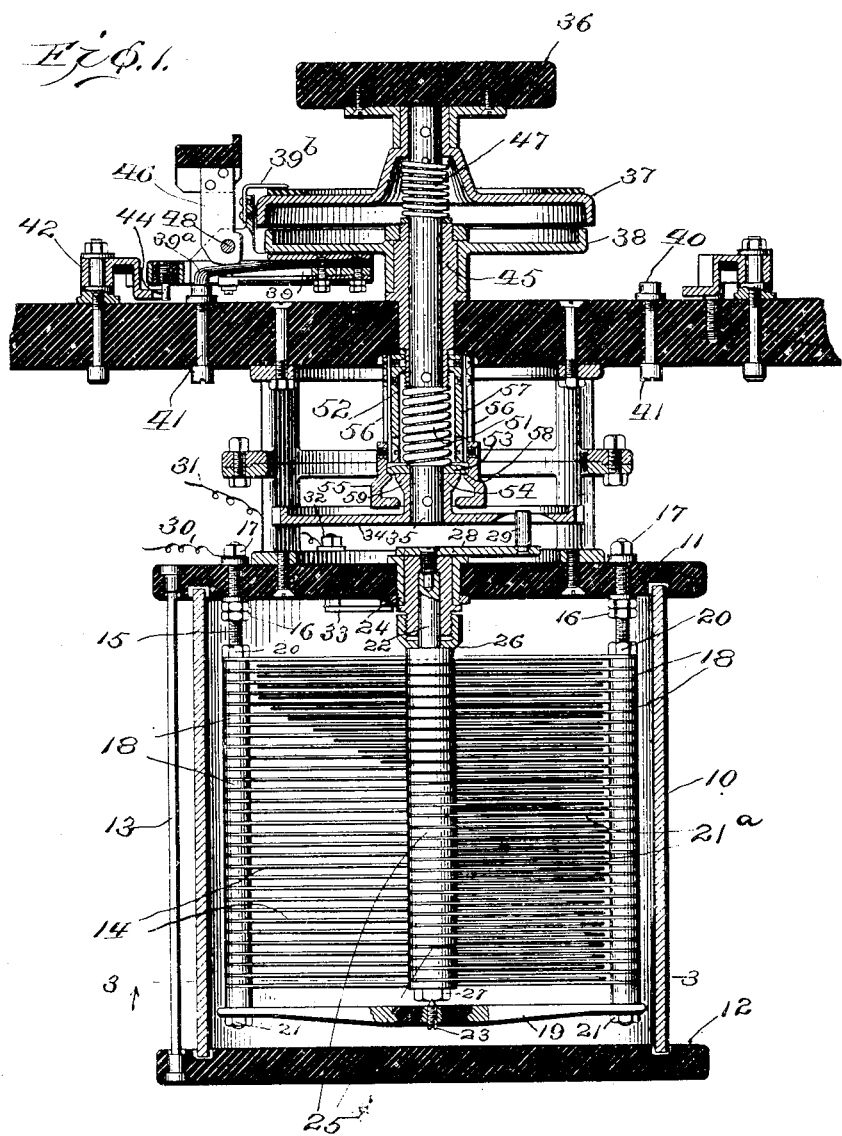

UNITED STATES PATENT OFFICE.

FRITZ LOWENSTEIN, OF BROOKLYN, NEW YORK.

VARIABLE ELECTRICAL APPARATUS.

1,258,423.  Specification of Letters Patent.  Patented Mar. 5, 1918.

Original application filed June 28, 1910, Serial No. 569,324. Divided and this application filed August 10, 1916. Serial No. 114,268.

*To all whom it may concern:*

Be it known that I, FRITZ LOWENSTEIN, a citizen of the United States, residing at Brooklyn, in the county of Kings and State of New York, have invented certain new and useful Improvements in Variable Electrical Apparatus; and I do hereby declare the following to be a full, clear, and exact description of the invention, such as will enable others skilled in the art to which it appertains to make and use the same.

This invention relates to variable electrical apparatus and more particularly to variable condensers adapted for use in wireless or radio work.

As heretofore constructed, variable condensers have been so designed that equal angular movements or displacements of the movable condenser plates within the working range of the instrument have produced unequal percentage variations in capacity. As set forth in my copending application, Serial No. 569,324, filed June 28, 1910, of which the present application is a division, I have found it desirable for certain purposes in the wireless art that equal angular movements of the movable plates should produce equal percentage changes in capacity. It is a principal object of the present invention to produce a condenser of this character.

In order that the same percentage change in capacity C may be produced by a given displacement of the movable plates at any point X on the characteristic or operating curve of the instrument, it is necessary that $$\frac{C_n - C_{n-1}}{C_{n-1}} = \frac{C_{n+1} - C_n}{C_n}$$

whence $$C_n^2 = C_{n-1} C_{n+1}$$

or $$C_n = \sqrt{C_{n-1} C_{n+1}}$$

The variations in capacity of the condenser must therefore follow the law of geometrical progression. The equation of the characteristic can be deduced from this consideration, and may take the form $$C = a \left(\frac{b}{a}\right)^{\frac{x}{d}},$$

where $a$ and $b$ are the lower and upper operating limits of the condenser capacity and $d$ is the maximum displacement for which the instrument is designed.

An equivalent expression can be derived from the fundamental consideration that $$\frac{\Delta C}{C} = \text{a constant}.$$

By integrating and transforming, $$C = p e^{nx}$$

where $p$ and $n$ are instrument constants, and $e$ is the base of Napierian logarithms.

For a rotary condenser, such as is hereinafter described, the equation may be written $$C = p e^{m\theta}$$

where $\theta$ is the angle of displacement in degrees.

From the foregoing it is evident that the active area of the movable surface of a condenser constructed in accordance with the invention, neglecting edge effects, is $$A = q e^{m\theta}$$

In this equation the constants $q$ and $m$ influence the minimum and maximum capacity values and therefore the operating range of the condenser.

In a practical form of rotary condenser embodying the principles of the invention, an operating curve of the desired character can be attained, for example, by making the superposed fixed condenser plates semicircular and of the same size, as is usual; while the movable plates are cut off at such different angles as to produce the logarithmic characteristic desired.

Approved apparatus of this description is illustrated in the accompanying drawings in which:—

Figure 1 is a vertical section of apparatus comprising the cut-off plate condenser associated mechanically with a variable inductance device, certain parts being in elevation;

Fig. 2 is a plan of the apparatus shown in Fig. 1; and

Fig. 3 is a transverse section on the line 3—3 of Fig. 1, viewed from below, the casing having been removed.

The condenser plates may be inclosed in a protective casing 10 provided with a cover plate 11 and a base plate 12, both made of suitable insulating material and secured together by means of rods 13. The semicircular stationary condenser plates 14 are supported in parallel relation by rods 15, which depend from the cover plate and are adjustably clamped thereto by nuts 16, 17. The rods 15 pass through holes provided in the stationary condenser plates, which are uniformly spaced apart by collars 18. A cross piece 19 connects the lower ends of the rods 15, and by means of clamping nuts 20, 21, the system of stationary condenser plates may be firmly clamped in fixed position.

The parallel movable condenser plates 21ª are suitably secured to a central vertical shaft 22 which is supported at its lower end on an adjustable pivot 23 and is held at its upper end in a bearing 24 in the cover plate. Spacing collars 25 are provided to maintain the plates 21, the proper distance apart, and they can be securely clamped in position between nuts 26 and 27. The relative positions of the fixed or stationary plates and the movable plates are such that when the central shaft is turned, the movable plates enter the spaces between the fixed plates in a manner to be more fully hereinafter explained. The shaft is arranged to be turned in this instance by a crank 28 secured to the upper end thereof and provided with a crank pin 29. The condenser may be connected in circuit by means of a lead 30 going to the fixed plates through supporting rods 15, and a lead 31 going to the movable plates through a binding post 32 and conductive strip 33 which makes electrical contact with the upper shaft bearing.

Returning now to the movable plates, it will be seen that, with the exception of a few at the top of the set which are full semicircular, they are cut off at angles which are progressively greater from the top downward. As a result, the edges of the movable set of plates are arranged in step-like fashion, so that the movable plates enter successively between the stationary plates as the shaft is turned. The proportioning of the plates and their arrangement is such that the capacity of the condenser is variable substantially in accordance with the logarithmic law given above. Furthermore, the change in capacity is much more gradual than in a condenser of the types heretofore known.

Although the described condenser may be usefully employed otherwise, it is here shown associated with a variable inductance element, also logarithmic in character, in such manner that both inductance and capacity may be varied together in a reciprocal relation, or each may be varied independently.

This combination forms no part of the present invention, but is described and claimed in my prior application aforesaid.

The mechanism will be briefly described here, however, for the sake of clearness.

In the arrangement here illustrated, the movable part of the condenser is turned by means of the crank 28, crank pin 29, crank disk 34, vertically movable shaft 35, and rubber knob 36. Attached to the shaft 35 is an upper clutch disk 37. To a lower clutch disk 38 is attached a self-inductance arm 39 carrying brush 39ª and wave length pointer 39ᵇ, the brush being arranged to make contact successively with the contact points 40, these latter being electrically connected by means of studs 41 and suitable leads with the tapping-off points of a suitable self-inductance coil (not shown). At 42 are pivotally mounted switches, each provided with a bifurcated projecting portion 43 so disposed that one or the other of the arms of said portion always lies in the circular path traversed by actuating stud 44 carried by the self-inductance arm. As the self-inductance arm is moved in counter-clockwise direction, the self-inductance increases, the stud acting successively on the switches 42 to cut in additional sections of the inductance coil. The lower clutch disk 38 is arranged to be turned individually on a post 45 by means of a handle 46. Spring 47 surrounding the vertically movable shaft 35 is compressed between the upper end of post 45 and the upper clutch disk 37, thereby tending to maintain the clutch members out of mutual engagement. Handle 46 is here shown as pivoted at 48, whereby it may be turned down to press brush 39ª into firm contact with any of the contact points.

Both the condenser and the self-inductance can therefore be varied independently, as for example in tuning a wireless circuit. Once tuning has been accomplished, the rubber knob 36 may be pushed down to engage clutch 37—38, and turning of the knob will then cause an equal angular displacement of the capacity and of the self-inductance. The capacity scale 49 and wave length scale 50 are both carried by the upper clutch member 37. Stationary pointer 49ª indicates the capacity readings, while wave lengths are indicated by the pointer 39ᵇ, before mentioned. In the present instance, clockwise movement of the knob, when the clutch is engaged, causes the capacity to increase and the self-inductance to decrease. To obviate the necessity of holding the knob 36 depressed during the turning of the coupled elements, a compression spring 51 is provided to keep the clutch members in engagement. This spring is confined between the lower end 52 of stationary post or sleeve 45 and washer 53, which latter rests on the hub 54 of the crank disk 34, the crank disk being secured to the vertically slidable shaft 35. The spring therefore tends to force said shaft downwardly to bring the clutch members into mutual engagement and thereby to mechanically couple the inductance and capacity elements. Said spring is of sufficient strength to overcome the opposing spring 47. In the position of the parts here shown, spring 51 is prevented from depressing the upper clutch member by means of latch members 55 which are carried on leaf springs 56 secured to a sleeve 57. Said leaf springs press the latch members inwardly so that their shoulders 58 may engage the under side of the washer 53. When the knob 36 is pushed down, the sloping cam surfaces 59 of the crank disk hub throw the latches 55 outwardly, thereby releasing washer 53 and the spring 51 confined thereby, the clutch being thereafter held in engagement by said spring.

It is to be understood that while specific mechanism for operating the movable parts of the condenser has been described in connection with one practical embodiment of the invention, any other convenient means for rotating the movable condenser plates may be employed. Moreover, it is to be noted that the broad principles of the invention are applicable not only to condensers, but also to other variable electrical apparatus such as variable inductances.

What I claim is:

1. A condenser comprising a set of stationary parallel plates suitably spaced apart, and a set of movable parallel plates adapted to enter between the stationary plates, the plates of one of said sets being so formed that a given angular displacement of the movable plates produces substantially the same percentage change in capacity at any point within the range of the instrument.

2. A condenser comprising a set of stationary parallel plates suitably spaced apart, and a set of movable parallel plates adapted to enter between the stationary plates, the plates of one set being so designed and arranged with respect to those of the other, that movement of the movable of plates produces variation of capacity in accordance with the law of geometric progression.

3. A condenser comprising a set of stationary parallel plates suitably spaced apart, and a set of movable parallel plates adapted to enter between the stationary plates, the plates of the movable set being cut off in such manner that equal displacements of the movable plates give equal percentage changes in capacity.

4. A condenser comprising a plurality of relatively movable plates so dimensioned that the change in capacity produced by a movement of the movable plates is to the movement that produced said change as C is to $x$ in the equation $$C = a\left(\frac{b}{a}\right)^{\frac{x}{d}}$$

where $a$, $b$, and $d$ are constants.

5. An electric condenser comprising stationary parallel plates and movable parallel plates adapted to enter between the stationary plates, the edges of the movable plates being arranged in step-like fashion to secure a more gradual change of capacity.

6. An electric condenser comprising stationary parallel plates and movable parallel plates adapted to enter between the stationary plates, the edges of the plates of one set being arranged in step-like fashion to secure a more gradual change of capacity.

7. An electric condenser comprising two sets of parallel plates having relative mobility and adapted to overlap more or less, the edges of the plates of one set being arranged in step-like fashion to secure a more gradual change of capacity.

8. A condenser comprising relatively movable coöperating condenser surfaces separated by a dielectric, said surfaces being so dimensioned and arranged that relative movement of said surfaces produces variations in capacity substantially in accordance with the law $$C = pe^{nx}$$

where C represents capacity, $p$ and $n$ are instrument constants, and $e$ is the base of Napierian logarithms.

9. Variable electrical apparatus comprising a fixed element and a movable element coöperating therewith to give a variable electrical value, the arrangement of said elements being such that the variations in electrical value produced by movement of said movable element follow substantially the law of geometric progression.

10. Variable electrical apparatus comprising relatively movable elements coöperating to give a variable electrical value, the arrangement of said elements being such that the variations in electrical value produced by relative movement of said elements follow substantially the law of geometric progression.

In testimony whereof I hereunto affix my signature.

FRITZ LOWENSTEIN.

Witnesses:
CHAS. W. SEITZ,
H. M. MARKS.